(12) United States Patent
Conrad

(10) Patent No.: US 11,333,182 B2
(45) Date of Patent: May 17, 2022

(54) TELESCOPIC POLE AND LOCKING MECHANISM

(71) Applicant: James R. Conrad, Salinas, CA (US)

(72) Inventor: James R. Conrad, Salinas, CA (US)

( * ) Notice: Subject to any disclaimer, the term of this patent is extended or adjusted under 35 U.S.C. 154(b) by 0 days.

(21) Appl. No.: 16/602,434

(22) Filed: Oct. 3, 2019

(65) Prior Publication Data
US 2020/0040923 A1 Feb. 6, 2020

Related U.S. Application Data

(63) Continuation-in-part of application No. 15/932,534, filed on Mar. 12, 2018, now abandoned.

(51) Int. Cl.
*F16B 7/14* (2006.01)
*E04H 4/16* (2006.01)
*B25G 1/04* (2006.01)

(52) U.S. Cl.
CPC .............. *F16B 7/1454* (2013.01); *B25G 1/04* (2013.01); *E04H 4/1609* (2013.01)

(58) Field of Classification Search
CPC ...... F16B 7/1454; F16B 7/105; E04H 4/1609; B25G 1/04; Y10T 403/079; Y10T 403/32483; Y10T 16/473
See application file for complete search history.

(56) References Cited

U.S. PATENT DOCUMENTS

| | | | | |
|---|---|---|---|---|
| 4,653,142 A * | 3/1987 | Upton | ...................... | A47L 13/24 15/144.4 |
| 5,983,455 A * | 11/1999 | Polzin | ................. | B05C 17/0205 15/144.4 |
| 6,832,784 B1 * | 12/2004 | Chen | ....................... | A47L 9/244 285/303 |
| 7,040,832 B2 * | 5/2006 | Hsieh | ...................... | F16B 7/105 248/125.8 |
| 7,481,408 B1 * | 1/2009 | Knight | .................... | E04G 25/06 248/354.1 |
| 7,588,042 B2 * | 9/2009 | Chang | .................... | A45B 19/04 135/25.1 |
| 7,681,349 B2 * | 3/2010 | Dicke | ....................... | G09F 7/18 40/586 |
| 7,886,396 B2 * | 2/2011 | Gracindo | ................ | A47L 13/26 15/144.4 |
| 7,959,191 B2 * | 6/2011 | Schouten | ................. | B25G 1/04 285/298 |
| 8,485,488 B2 * | 7/2013 | Forrest | ................... | A47B 91/02 248/408 |
| 8,758,155 B1 * | 6/2014 | Demkowski | ........... | A63B 53/12 473/296 |

(Continued)

*Primary Examiner* — Victor D Batson
*Assistant Examiner* — Matthew J Sullivan
(74) *Attorney, Agent, or Firm* — Jeffrey A. Hall

(57) ABSTRACT

An apparatus for cleaning swimming pools, cement finishing tools, ceiling wire applications, and the like, comprising a first tube having a first end with a collar housing and a first locking assembly with a first collar housing. The second end of the first tube being configured for attaching a tool thereto. An end tube with a first end having a second locking assembly and a second collar housing, is slidably connected to a decagon shaped inner tube having a first end and a second end. The first end of the inner tube being secured to the first tube by the first locking assembly, and the second end being secured to the end tube by the second locking assembly.

16 Claims, 13 Drawing Sheets

(56) References Cited

U.S. PATENT DOCUMENTS

| | | | | |
|---|---|---|---|---|
| 8,939,051 B1* | 1/2015 | Lofley, Sr. | ............... | B25G 1/04 |
| | | | | 81/177.2 |
| 9,155,947 B2* | 10/2015 | Aguinaldo | ............. | A63B 53/14 |
| 10,611,013 B2* | 4/2020 | Cavaliere | ................. | B25G 1/04 |
| 2001/0024594 A1* | 9/2001 | Taylor | ....................... | B25G 1/04 |
| | | | | 403/109.7 |
| 2004/0016385 A1* | 1/2004 | Wilcox | ................. | A01K 91/08 |
| | | | | 114/255 |
| 2005/0097691 A1* | 5/2005 | Tsuchiya | ................. | A47L 13/20 |
| | | | | 15/144.4 |
| 2007/0108756 A1* | 5/2007 | Laakso | ............... | A63C 11/221 |
| | | | | 280/823 |

* cited by examiner

TELESCOPIC POLE AND LOCKING MECHANISM

CROSS REFERENCE TO RELATED APPLICATIONS

This Patent Application is a continuation-in-part of and claims priority from U. S. patent application Ser. No. 15/932,534 filed Mar. 12, 2018.

BACKGROUND OF THE INVENTION

Technical Field

This invention relates to devices for cleaning swimming pools, cement finishing tools, ceiling wire tools and the like, and more particularly to an apparatus and method using a telescopic or expandable pole for attachment to tools for cleaning swimming pools, cement finishing tools, ceiling wire apparatus, and other objects.

Background Art

Various devices have been proposed and implemented for holding and positioning tools and other articles using telescopic poles, sometimes referred to as telepoles. Such devices allow a user to both grip the tool and increase extension, reach, and leverage. Many examples of such prior extendable handles for tools and other implements exist and include, extendable handles for shovels, brushes, hammers, screwdrivers, mops, rakes, and the like. Although prior devices have been adapted and used for such various purposes, there exists a need for a telescopic handle for swimming pool cleaning devices which can be used for positioning and securing a cleaning tool securely even under high pressure and tension which arises from strongly pushing or pulling the tool through water.

A telescoping or extendable handle are very useful for swimming pool cleaning tools so that the user can clean the pool without getting wet while standing or walking along the side of the pool. Similar extendable handle tools are used for painting, window washing, and concrete and paving operations.

Examples of extendable handles or telescoping poles are those with two separate lengths of tubing, configured so that one slides within the other to adjust the overall length of the pole, and a positioning or locking device so that when locked, the the two lengths do not move or slide with respect to one another.

Such extendable handle or telescoping poles are typically composed of aluminum, fiberglass or other strong, durable material. A plurality of apertures are positioned so that a pin or other fastening means can be inserted often via a collar type mechanism and thereby position the tubes at varying lengths in relation to each other as desired.

Other telescoping poles use external locking devices, compression rings, or sliding lock assemblies for retaining and positioning the tubes relative to one another. Other examples include internal and external locking devices, multiple locking mechanisms and the use of three tubes.

Such prior telescoping or extendable poles, however, have serious limitations which have limited there usefulness, especially in the application to swimming pool tools and cleaning devices. One such limitation is that the locking mechanisms often weaken or loosen, resulting in collapse or slippage when pressure is applied during use.

Further such prior poles are prone to bending and weakening of the locking means which are subject to wear and tear over time. This results in deformation and sliding of the inner tube within the outer tube. And may result in jamming or the inability of the inner tube to properly slide and be aligned within the outer tube. Or if the locking and position means fail the inner tube may be overextended and completely separate from the inner tube. Prior poles typically used a series of bolt holes drilled into the inside pole which met with a pin located in a handle assembly that is controlled by spring pressure which forces the pin into a hole and stays in place while forward and backward movement is applied. The major problem with this prior mechanism was that the pivot hole or bolt hole located in the handle has to be above the location of the drilled holes in the inside tube. By locating this pin hole above the tube, this creates an alignment which favors the pin to pull up an out of the hole, resulting in pole failure and collapse.

Further limitations of prior devices are seen with grips that fail to secure tightly to the inner tube allowing slippage of the inner tube if that tube slides too far within the outer tube. This may require repositioning or reassembly of the pole again prior to use.

The present invention provides an improved telescoping or extendable pole for swimming pool cleaning and maintenance tools, cement finishing tools, ceiling wire applications, and the like, which overcomes the defects of prior telescoping or extendable poles and handles. The present invention provides a reliable, stable, and easy to use and operate telescoping pole or handle for swimming pool cleaning and maintenance tool, and other tools using extendable handles. The improved telescoping or extendable pole of the present invention comprises an three interconnecting tubes, a first tube, a middle tube and an end tube, which may be round, decagon, dodecagon or otherwise and includes two locking assemblies each with an angled locking pin to secure the tubes in a desired position. In one embodiment the tubes are fabricated from a durable, lightweight material such as aluminum, but may be otherwise. If desired a reinforcement wall may be provided, but may be otherwise. One end of the inner tube preferably has a detachable grip mounted thereon, allowing for easy gripping and grasping of the inner tube. The tubes have a plurality of apertures along their length which are positioned to receive a pin element or other fastening means of the locking assemblies. The pin element is preferably tapered or having a ring groove or notch therein. The locking assemblies preferably include a housing or collar is provided through which the inner tube slides and in which the locking assemblies are housed. The locking assemblies include a pin or other fastening device is preferably attached to an angled arm element and secured by a screw, pin, bolt, or other fastening means to the collar or housing. An actuator button is pressed to depress the pin or other detent means into a selected aperture in the inner tube, thereby adjusting the length of the telescoping pole or handle as desired. Preferably, the end of the outer tube opposite from the housing or collar, has a plurality of apertures for attaching and detaching swimming pool cleaning tool and additional apertures may be provided for draining water from the outer tube further if a swimming pool cleaning tool is secured to the outer tube.

Another object of the present invention, is to provide a telescoping or extendable tools for cleaning swimming pools and the like, in which two locking assemblies hold three pole sections together and securely maintains the integrity of the extended length of the pole under all conditions of use.

A still further object of the present invention is to provide a lightweight telescoping pole for pool cleaning tools and the like, that includes one or more springs or compression type device for positioning the locking assemblies in a desired location, thereby firmly securing the three tube sections at a desired length.

Yet another object of the present invention is to provide a lightweight telescoping pole for pool cleaning tools and the like, that includes a grooved grip that is detachably secured to the inner tube at an end thereof.

Accordingly, the primary object of the present invention is to provide a telescoping or expandable pole or handle for swimming pool cleaning tools, that is very stable and secure under high pressure and stress, and is easy to assemble or disassemble, and may be used with a wide variety of pool cleaning tools, and other tools as desired.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

SUMMARY OF THE INVENTION

To achieve the foregoing objects, and in accordance with the purpose of the invention as embodied and broadly described herein, an apparatus for cleaning swimming pools, cement finishing tools, ceiling wire applications and the like comprises a first tube having a first end with having a collar housing and first locking assembly with a first collar housing. The second end of the outer tube being configured for attaching a tool thereto. An end tube with a first end having a second locking assembly and a second collar housing, is slidably connected to a decagon shaped inner tube having a first end and a second end. The first end being secured to the first tube by the first locking assembly, and the second end being secured to the end tube by the second locking assembly. The first tube shaped to slide within the inner tube is configured to slide within the end tube, each tube can be secured in a selected position in relation to each other allowing for angled pins or buttons to be secured in one of a plurality of apertures in the tubes. A plurality of apertures are aligned on the tubes, so that the angled pin which may be tapered or ringed to snap in the apertures secure the tubes in place as desired. The pin or pins are snapped into or operably engaged with one of the apertures, to secure and position the tubes at a selected position. In one embodiment the locking mechanism of comprises a pin that is tapered has a ringed notch therein, and includes an angled actuator arm. The locking mechanism may include an actuator means, which may comprise a enlarged surface area to facilitate activating the angled actuator arm secured to a spring mechanism. The first and second first and collar includes a fastening mechanism, such as a screw or bolt, for securing and tightening the lever in the collar. The first tube and inner tube may include an inner insert or stop for engagement of the spring and pin. The pins or buttons may include a ring-shaped mechanism for securing pins or buttons locking within one of the plurality of apertures in the tubes.

BRIEF DESCRIPTION OF DRAWINGS

The accompanying drawings, which are incorporated in and constitute a part of the specification, illustrate a preferred embodiment of the invention and, together with a general description given above and the detailed description of the preferred embodiment given below, serve to explain the principles of the invention.

DETAILED DESCRIPTION OF THE PREFERRED EMBODIMENT

Reference will now be made in detail to the present preferred embodiments of the invention as illustrated in the accompanying drawings.

Figure 1:
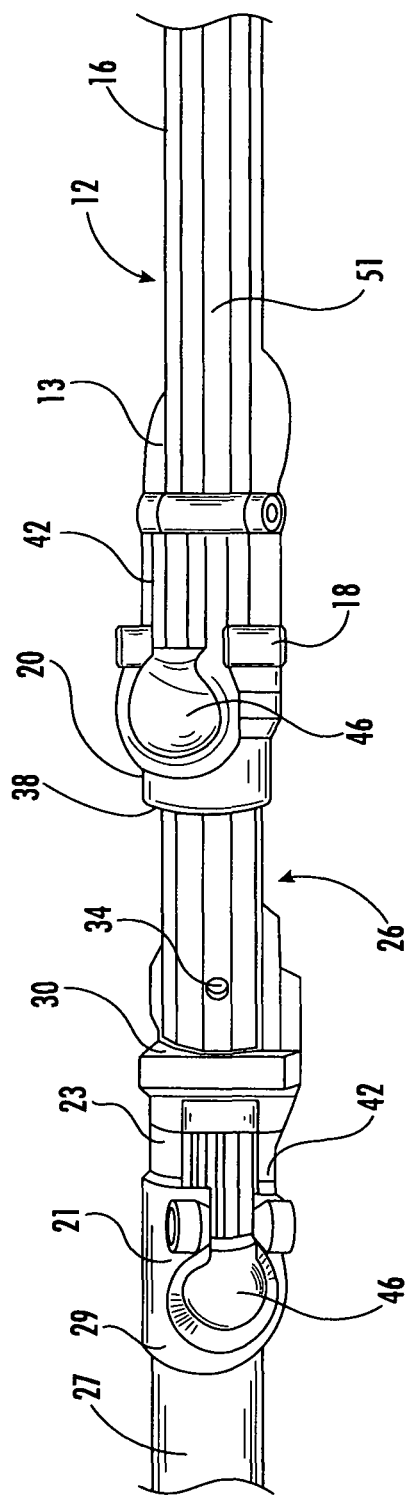
FIG. 1 shows a telescopic pole for swimming pool tools and the like, with two locking assemblies and with a first tube, an inner tube, and an end tube according to the invention.

In accordance with the present invention, and as seen in FIG. 1, there is provided in a preferred embodiment of the invention, an apparatus or tool 10, for cleaning swimming pools, cement finishing tools, ceiling wire applications and the like, comprising a first tube 12, which is preferably decagon shaped, but may also be dodecagon shaped, round, or otherwise, having a first end 13, with a first collar housing 18, and a first locking assembly 20. The second end 17, of the outer tube is configured for attaching a tool thereto, best seen in FIG. 3. An end tube 27, which is preferably round, but may be shaped otherwise such as decagon, dodecagon or otherwise, has a first end 29, and a second locking assembly 21, housed within a second collar housing 23. A preferably decagon shaped inner tube 26, which may alternatively be configured as a dodecagon, round or otherwise, has a first end 28, and a second end 30. The first end 28, is secured to first tube 12, by first locking assembly 20, and the second end 30, is secured within end tube 27, second locking assembly 21. In one embodiment, as seen in FIG. 3, tube 26, includes a detachable grooved grip 32, for grasping tool 10. In the embodiments shown in FIGS. 1 and 2, the grip would be secured on first tube 12. Preferably, inner tube 26, is adapted and configured to be received within end tube 27, within an aperture in second collar housing 23. Inner tube 26, is shaped to slide within the end tube 27, to a selected position in relation to the end tube allowing for second locking assembly 21, to position and secure inner tube 26, within the end tube. A plurality of apertures 34, aligned on the inner tube 26, so that second locking assembly 21, which includes an angled pin 38, best seen in FIGS. 11, 12 and 13, may be operably engaged with one apertures 31, to secure and position the inner tube 26, at a selected position within 27 end tube.

Figure 2:
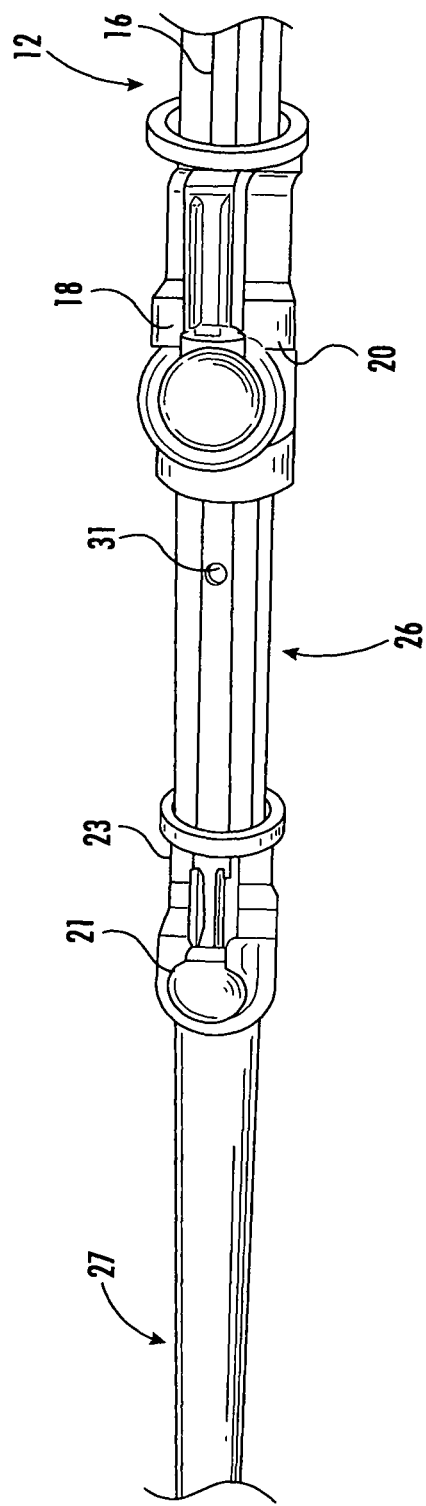
FIG. 2 shows a telescopic pole for swimming pool tools and the like, a decagon shaped end tube with apertures, according to the invention.
Figure 3:
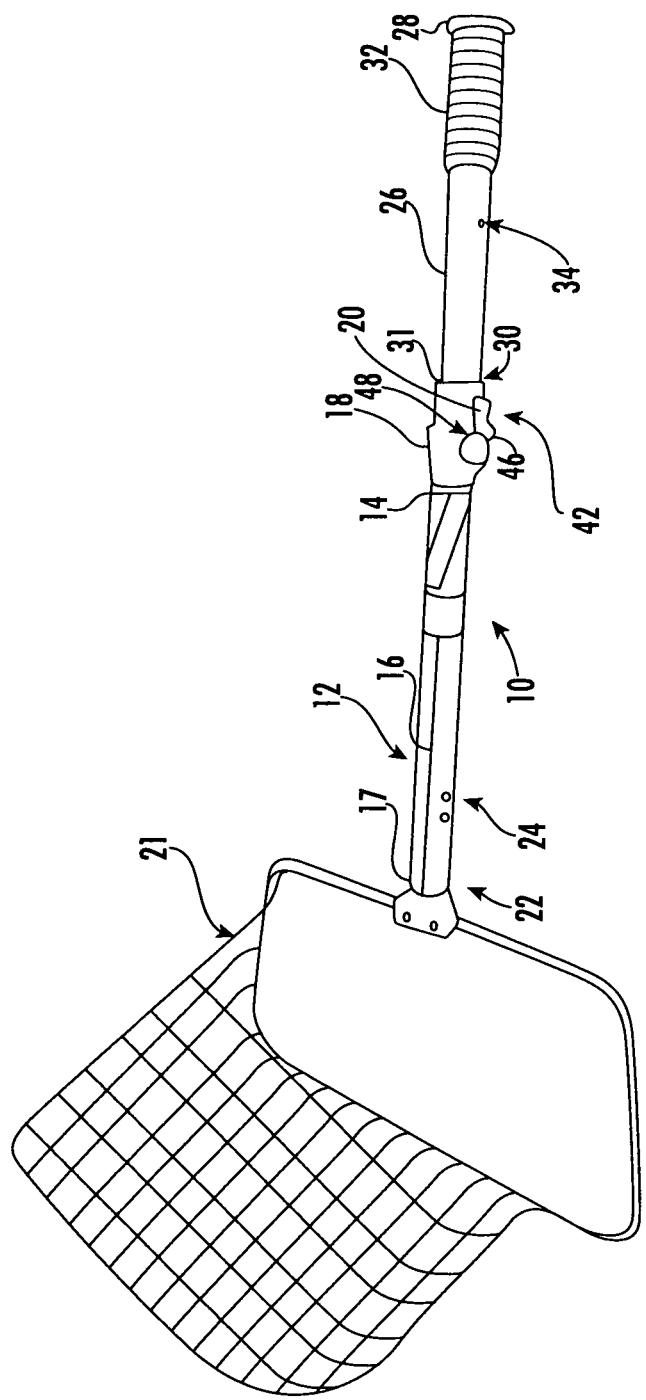
FIG. 3 shows another embodiment of the invention with two tubes and one locking assembly, according to another embodiment of the invention.

In FIG. 2 a preferred embodiment of the invention is shown, and similar to FIG. 1, has first decagon shaped tube 12, secured within inner tube 26, by first locking assembly 20, and a second end 30, being secured within end tube 27, by second locking assembly 21, with housing 23.

In accordance with the present invention, and as seen in FIG. 3. there is provided in another embodiment of the invention, where apparatus or tool 10, has two tubes, inner tube 26, and first tube 12, having a first end 14, and a second end 17. The first end 14, of the outer tube 12, has a collar housing 18, and first locking assembly 20, and the second end 17, of first tube 12, having apertures 24 for attaching a tool thereto, such as leaf skimmer 21, which may be a plurality of apertures 22, and drain hole 24. Preferably decagon shaped inner tube 26, is provided having a first end 28, and a second end 30, and includes a detachable grooved grip 32, for grasping and positioning apparatus 10, as desired. The second end 30, of the inner tube 26, is adapted and configured to be received within the first tube 12, within an aperture 31, of collar housing 18. The inner tube 26, is shaped to slide within the outer tube 12, to a selected position in relation to the outer tube 12, allowing for the locking assembly 20, to position and secure the inner tube 26, within the outer tube. A plurality of apertures 34, are aligned on the decagon shaped inner tube 26, so that locking assembly 20, may be operably engaged with one of the apertures 34, so as to secure and position the inner tube 26, at a selected position within the first tube 12. The apparatus, in a preferred embodiment uses a tapered 38, or ringed pin 40, best seen in FIGS. 11, 12, and 13, for the locking assembly 20. The locking means of the angled detent 20, also preferably includes an angled actuator arm 42, see for example FIG. 5. Locking assembly 20, also includes an actuator means, comprising a enlarged surface area 46, to facilitate activating angled actuator arm 42, when pushed or depressed. The collar housing 18, which houses locking assembly 20, includes a fastener 48, such as a screw, bolt or the like, for securing and tightening collar housing 18, to outer tube 12. Preferably, the inner decagon shaped tube 26, includes an inner insert 50, best seen in FIG. 4, for support and for engagement with the pin.

In the embodiment shown in FIG. 3, the telescoping tool or apparatus 10, comprised of inner tube 12, and inner decagon shaped tube 26, utilize the angled detent 20, with either tapered ring 38, or notched or ringed pin 40, for locking the apparatus in position. It is essential that the pole can be locked in a chosen position without collapsing or rotating. The locking mechanism provided by locking assembly 20, positioning and snapping or locking and pins 38, or 40, in apertures 34, is preferably controlled by a spring pressure mechanism, comprising a spring 52, best seen in FIGS. 17 and 18, operably positioned within locking assembly 20. The spring pressure forces pin 38 or 40, into one of the apertures 34, in inner decagon shaped tube 26, and because of the angled detent 20, and tapered 38, or ringed pin 40, the pole is locked together at a desired length and remains stable when either forward or backward motion is applied. This is the same mechanism as for the embodiment in FIGS. 1 and 2, where two locking assemblies are used, 20 and 21 in the same manner. The tapered rings 38, or angled ring 40, prevent the pins from pulling up and out of apertures 34.

It is also seen in FIGS. 1 and 2 that collar housings 18 and 23, prevents the pins from exposure to outside damage if the apparatus 10, is dropped on the ground. The locking mechanism provided by locking assembly 20 and 21, and the tapered pins 38, or ringed pin 40, with spring 52, is completely protected by collar housings 18 and 23, which protects the pin and detent mechanism form outside damage.

Figure 11:
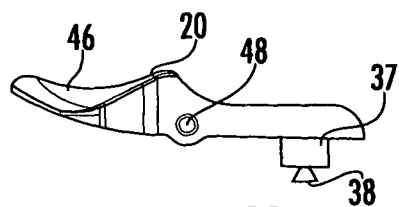
FIG. 11 shows a side view of the angled actuator arm removed from the housing and having a tapered pin, according to one embodiment of the invention.
Figure 12:
FIG. 12 shows a tapered pin according to one embodiment of the invention.

In FIGS. 1 and 2, first locking assembly includes a tapered pin 38, best seen in FIGS. 11 and 12. In another embodiment the pin in both first locking assembly 20, and second locking assembly 21, may be a ringed pin 40, shown 15. In other embodiments second locking assembly has tapered pin 38, or alternatively a ringed pin 40, such as in seen in FIGS. 11 and 12. a ringed pin. In the preferred embodiments shown in FIGS. 1 and 2 inner tube 26, preferably includes inner stops best seen in FIG. 19.

Figure 5:
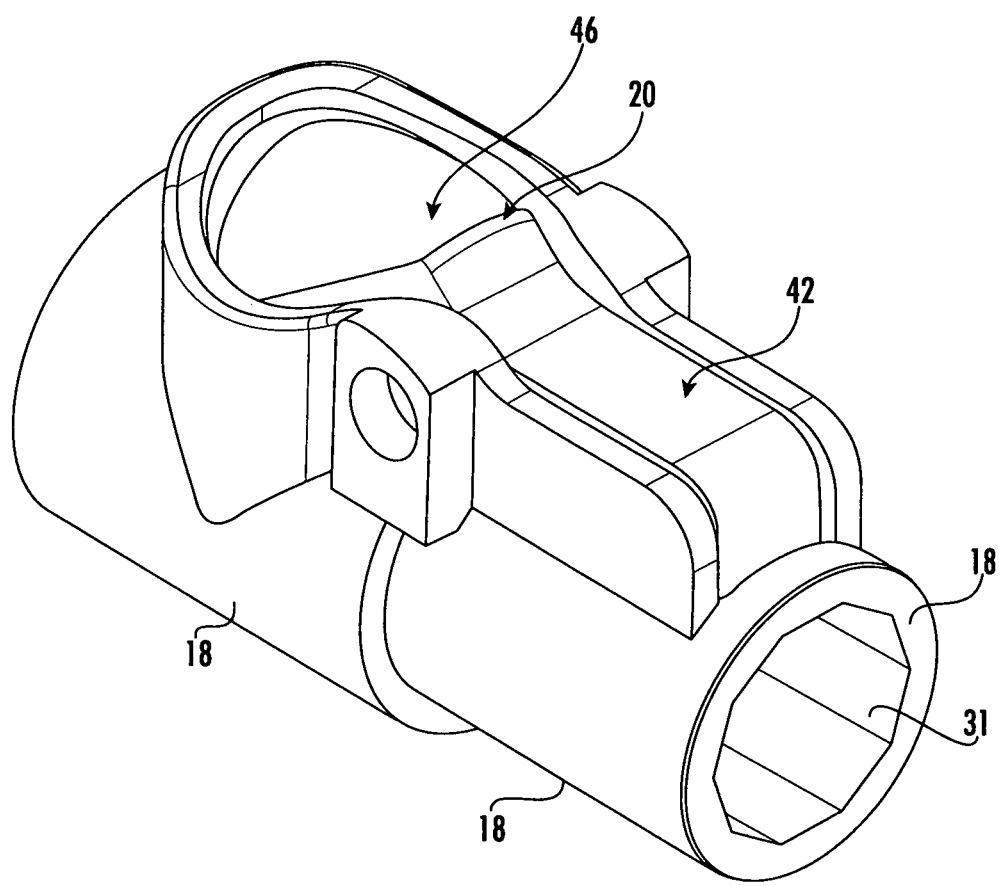
FIG. 5 shows a collar housing and angled actuator arm, according to the invention.

Preferably, first and second locking assemblies 21 and 21 include an first angled actuator arm 42, with includes an angled actuator arm 42, also include an actuator, comprising a enlarged surface area 46, to facilitate activating angled actuator arm 42, when pushed or depressed. This is best seen in FIG. 5. Collar housing 18, and 23, which houses locking assemblies 20 and 21, includes a fastening means 48, such as a screw, bolt or the like, for securing and tightening the actuator arm in collar housing 18.

First locking assembly 21, includes a second angled actuator arm 42, and a actuator 46, comprising a enlarged surface area to facilitate activating said second angled actuator arm. This is best seen in FIG. 5. The second locking assembly 21 is the same.

Figure 19:
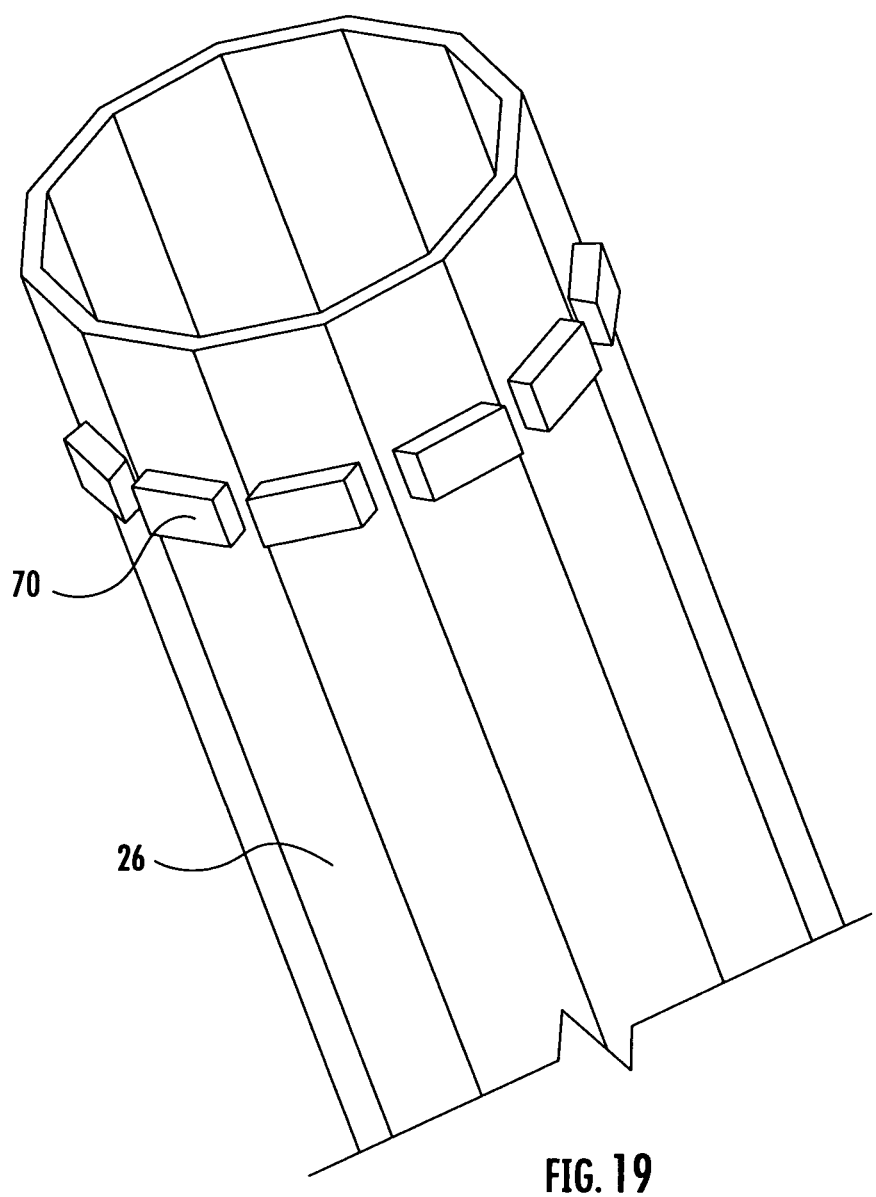
FIG. 19, shows an example of stops which may be used on the first and inner tube, according to the invention.
Figure 22:
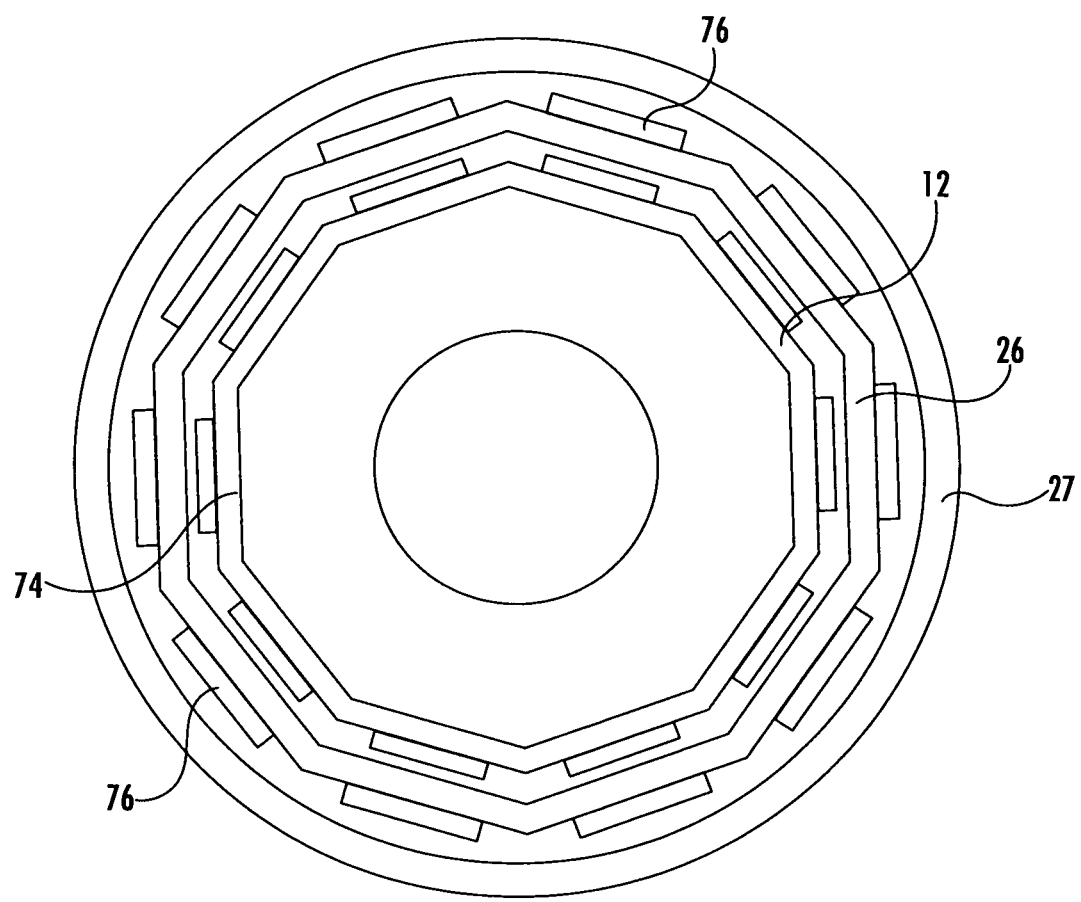
FIG. 22, shows a plurality of stops used preferably on the first and inner tube, according to the invention.

Preferably, a plurality of stops 70, are used n inner tube 26, best seen in FIGS. 19 and 22. This prevents the assembled tool from coming apart while in use. Preferably, stops are used on each section of the inner tube. The stops may be made by forming flats or protrusions on each flat section of the decagon shaped tubes 12 and 26. Other stops may also be strategically placed on tubes 12 and 26, which may be taller in size or larger in size on the outside diameter of the tube 12 and 26, than the stops used on the inner surfaces.

The first collar housing 18 includes a fastening mechanism 48, such as a screw, bolt or the like for securing and tightening first collar housing 18, to the inner tube 26. Similar fastening mechanisms, such as screws, bolts, or the like are used to secure the second collar housing 23, to end tube 27.

Figure 14:
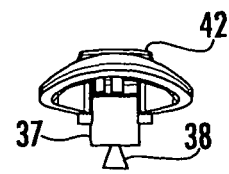
FIG. 14 shows a pin attachment mechanism of the locking assembly with pin, according to one embodiment of the invention.

Preferably, first and second locking assembly 20 and 21, include a ring-shaped mechanism 37, best seen in FIGS. 11 and 14, for securing angled pin 38 within one of the apertures in the inner tube 26 or first tube 12 tube. Also seen in FIGS. 1 and 2, first tube 12, includes a groove 16, on a side thereof to prevent slippage of tapered pin of locking assembly 20.

In accordance with the present invention, and as seen in FIG. 3. there is provided in another embodiment of the invention, an apparatus or tool 10, for cleaning swimming pools, cement finishing tools, ceiling wire applications and the like, having two pole segments, comprising an first tube 12, having a first end 14, and a second end 17. The first end 14, of the outer tube 12, has a collar housing 18, and locking assembly 20, and the second end 17, of said outer tube 12, having means for attaching a tool thereto, such as leaf skimmer 21, which may be a plurality of apertures 22, and drain hole 24. A preferably decagon shaped inner tube 26, is provided having a first end 28, and a second end 30, and includes a detachable grooved grip 32, for grasping and positioning apparatus 10, as desired. The second end 30, of the inner tube 26, is adapted and configured to be received within the first tube 12, within an aperture 31, of collar housing 18. The inner tube 26, is shaped to slide within the outer tube 12, to a selected position in relation to the outer tube 12, allowing for the angled detent 20, to position and secure the inner tube 26, within the outer tube. A plurality of apertures 34, are aligned on the decagon shaped inner tube 26, so that the locking assembly 20, which includes a locking mechanism, may be operably engaged with one of the apertures 34, so as to secure and position the inner tube 26, at a selected position within the outer tube 12. The apparatus, in a preferred embodiment uses a tapered 38, or ringed pin 40, best seen in FIGS. 10, 11, and 12, for the locking mechanism of the locking assembly 20. The locking mechanism of the locking assembly 20, also preferably includes an angled actuator arm 42, see for example FIG. 5. The locking mechanism of the locking assembly 20, also includes an actuator, comprising a enlarged surface area 46, to facilitate activating angled actuator arm 42, when pushed or depressed. The collar housing 18, which houses locking assembly 20, includes a fastener 48, such as a screw, bolt or the like, for securing and tightening collar housing 18, to outer tube 12.

As seen in FIG. 3, the embodiment of the apparatus for cleaning swimming pools, cement finishing tools, ceiling wire applications 10, is shown with first tube 12 and inner tube 26. In the preferred embodiments shown in FIGS. 1 and 2, an end tube with a second locking assembly 212 is utilized. Preferably, the telescoping pole 10, utilize locking assembly 20 and 21 as seen in FIGS. 1 and 2, and in other embodiment such as seen in FIG. 3 uses one locking assembly 20. Locking assemblies 20 and 21 are similar and both use either tapered ring 38, or notched or ringed pin 40, for locking the apparatus in position. It is essential that the pole can be locked in a chosen position without collapsing or rotating. The locking mechanism provided by locking assembly 20 and 21, positioning and snapping or locking and pins 38, or 40, in apertures 34, is preferably controlled by a spring pressure mechanism, comprising a spring 52, best seen in FIGS. 17 and 18, operably positioned within locking assemblies 20 and 21. The spring pressure forces pin 38 or 40, into one of the apertures 34, in inner decagon shaped tube 26, and because of the locking assembly 20 and 21, and tapered 38, or ringed pin 40, the pole is locked together at a desired length and remains stable when either forward or backward motion is applied. The tapered ring 38, or angled ring 40, prevent the pins from pulling up and out of apertures 34.

It is also seen in FIGS. 1, 2, 3, that collar housing 18 and 23 prevent the pins from exposure to outside damage if the apparatus 10, is dropped on the ground. The locking mechanism provided by locking assembly 20 and 21, and the tapered pins 38, or ringed pins 40, with spring 52, is completely protected by collar housing 18 and 23, which protects the pin and detent mechanism form outside damage.

Figure 4:
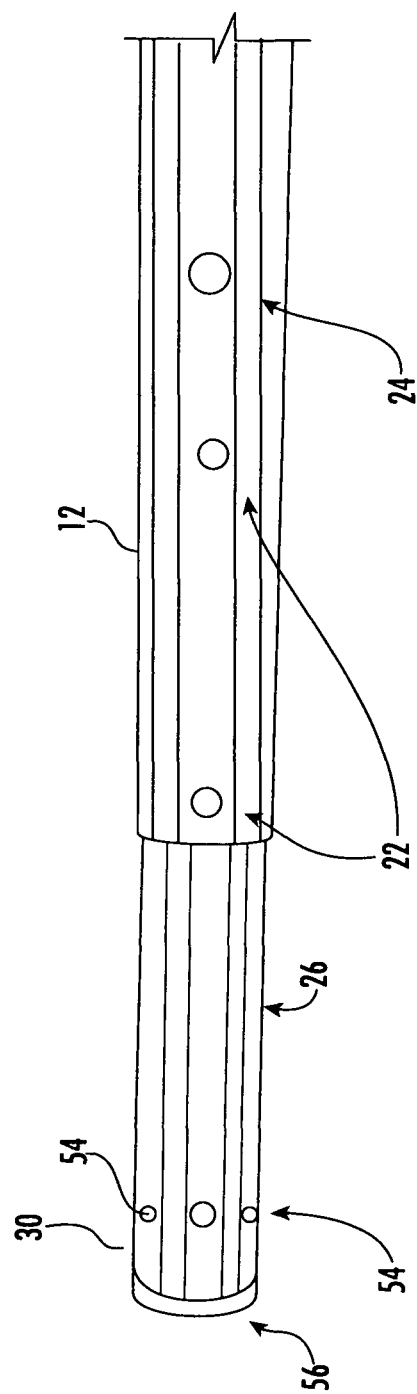
FIG. 4 shows a stop ring mechanism for the telescopic pole for swimming pool tools and the like, according to the invention.

With reference now to FIG. 4, an embodiment of the apparatus or tool 10, is shown according to another embodiment of the invention where a two tube segments are used, and where a plurality of stops or stop buttons 54, are positioned near the second end 30, of inner decagon shaped tube 26. A stop ring 56, is operably secured to the end and this provides a stop on the pole, preventing inner tube 26, from pulling out of first tube 12. Stop buttons 54, stop when hitting the inside of collar housing 18, which in addition to stop ring 56, creates a stop. In alternative embodiments, stop ring 56, may be eliminated, thereby using the stop buttons 54, as the sole stop mechanism.

With reference to FIG. 5, collar housing 18, which is identical to collar housing 23, and and locking assembly 20, are shown detached from the first and inner tube, and configured similarly as to locking assembly 21 with second collar housing 23, according to a preferred embodiment of the invention. Preferably locking assembly 20, is configured with an actuator, which is shown as enlarged surface area 46, and angled actuator arm 42, and decagon shaped inner wall 31.

Figure 6:
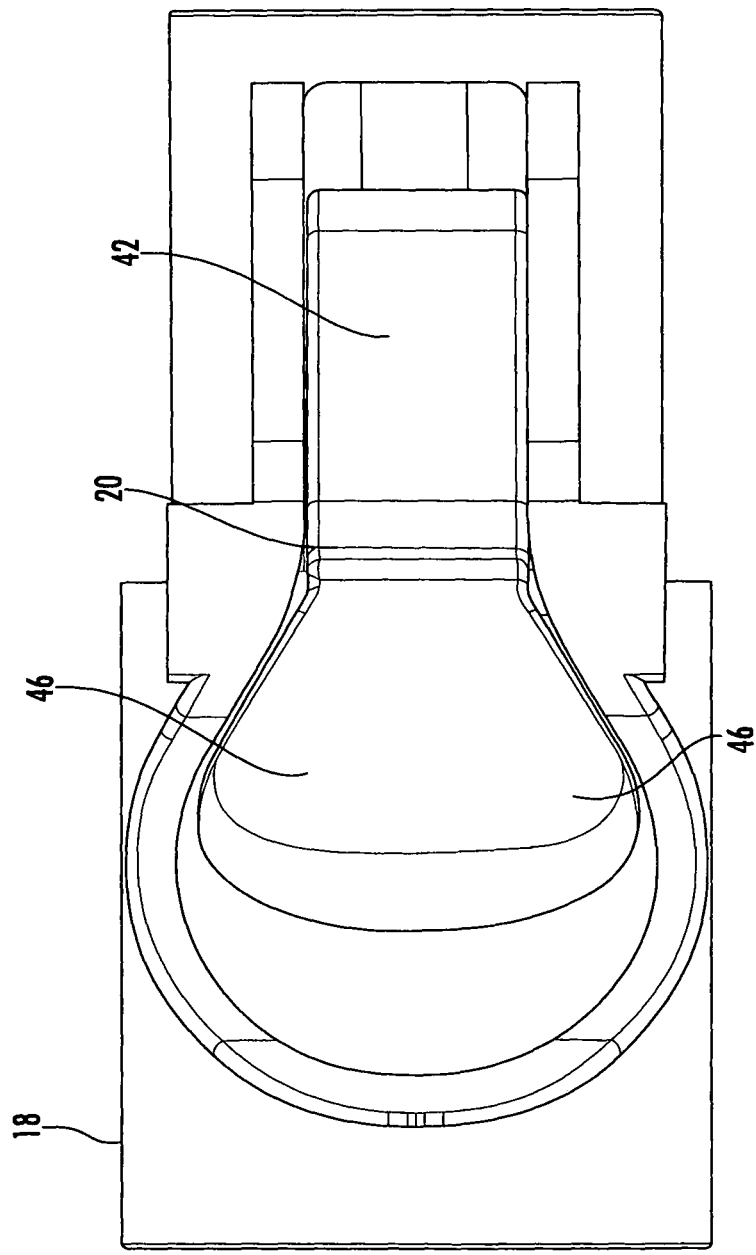
FIG. 6 shows a top view of the angled detent within the housing, according to the invention.
Figure 7:
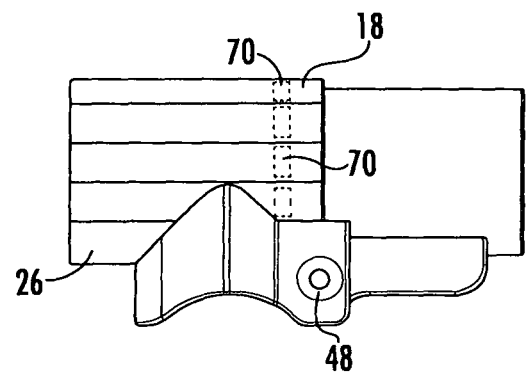
FIG. 7 shows a side view of the housing for the angled detent with attachment screw or bolt, including internal stops in guide fittings, according to the invention.

In FIG. 6, a top view of the locking assembly 20, within the collar housing 18 is shown, according a preferred embodiment of the invention. Preferably locking assembly 20, is configured with actuator, which is shown as enlarged surface area 46, and angled actuator arm 42. A side view of collar housing 18, for the angled detent with attachment screw or bolt 48, is seen in FIG. 7, according to the invention, here with stops 70, shown. Stops are used to prevent the finished apparatus from coming apart while in use. This is preferably achieved by using a plurality of stops, which may be flats or protrusions on each flat section of decagon shaped first tube 12 and inner tube 26.

Figure 8:
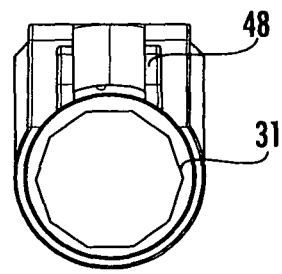
FIG. 8 shows an end view of the housing for the angled detent having a decagon shaped inner surface, according to the invention.

In FIG. 8 an end view of the collar housing 18, for the locking assembly 20, is shown, having decagon shaped inner surface 31, to receive the inner tube of the telescoping pole, and fastener 48, according to the invention. If the center of surface 31, is dropped approximately 0.010 inches, this adds additional clearance for the pin coming through the inner tube and passing or missing the end tube 27.

Figure 9:
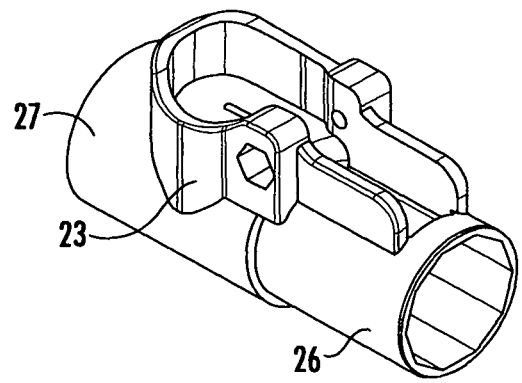
FIG. 9 shows a shows a top perspective view of a collar housing for the angled actuator arm, according to the invention.

With reference now to FIG. 9, shows a top perspective view of collar housing 23, for the second locking assembly, for securing inner tube 26 to end tube 27. In FIG. 9, second collar housing 23, is illustrated alone, without second locking assembly 21, for illustrative purposes, according to a preferred embodiment of the invention.

In FIG. 9, angled actuator arm 42, of locking assembly 20, is removed from the collar housing 18. Fasteners 48, which can be a screw, bolt, rivet, or other fastening mechanism well know in the art is shown. A preferred configuration of enlarged surface area 46, and angled actuator arm 42 is shown. Tapered pin 38, is shown providing a locking means for the telescoping pole are shown according to a preferred embodiment of the invention.

Figure 10:
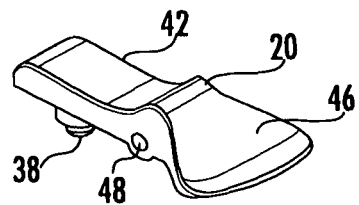
FIG. 10 shows an angled actuator arm removed from the collar housing, according to the embodiment of the invention.
Figure 15:
FIG. 15 shows a ringed or notched pin according to one embodiment of the invention.

Referring now to FIG. 10, a side view of locking assembly 20, removed from housing 18, and this would be similar with second locking assembly 23. In FIG. 11 tapered pin 38, is secured to mount 37, is shown, according to one embodiment of the invention. In FIG. 12, tapered pin 38, is shown detached from the angled detent. Tapered pin 38, may also be provided in alternative configurations such as seen in FIG. 15 where a notch or ringed pin 40, is provided. In any configuration, whether tapered, or ringed, or notched, the pin is controlled by spring pressure and is snapped or pushed into one of the plurality of apertures on the dodecagon shaped inner tube. Because the angle between the aperture and the pin or button are not the same angle the pin or button sections tends to pull out when the pole or apparatus is pulled. This disengages the lock. By tapering pin or button 38, it stays in place during pulling action of the pole when in use. This is of importance only on the pulling of the pole and but not pushing of the pole.

Figure 13:
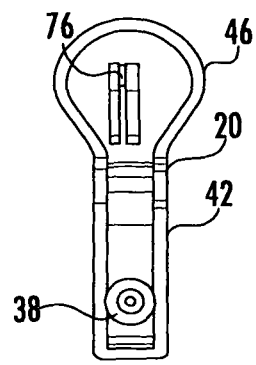
FIG. 13 shows a bottom view of an angled actuator arm removed of the locking assembly removed from the housing, according to one embodiment of the invention.
Figure 18:
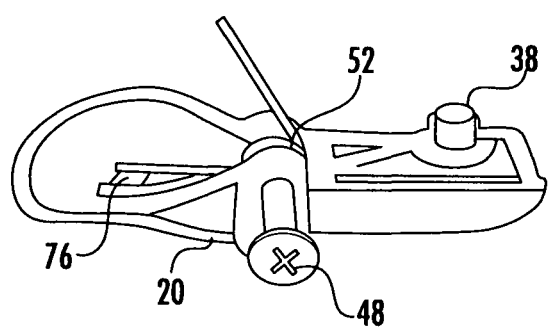
FIG. 18 shows the assembled spring pressure mechanism of of a locking assembly, according to one embodiment of the invention.

In FIG. 13, first locking assembly 20 is seen with pin or button 38, and enlarged surface area 46. Note that angled actuator arm 42, spring assembly in a channel for the spring to rest in place has a stop 76, placed at a selected length for one of the legs of the spring. This allows the spring and lever to be easily replaced without moving out of position. Without stop 76, the spring would tend to slid back and becomes difficult to reassemble. Also see FIG. 18 showing the positioning of stop 76 and spring 52.

Preferably, first tube 12, decagon inner tube 26, and end tube 27, are composed of a durable resilient material such a aluminum or other metal, plastic, rubber, or the like. It is also noted, that in other embodiments, inner tube 26, may have an alternative configuration which is dodecagon shaped, round, or rectangular, hexagon, or pentagon shaped as desired, but preferably is shaped a as decagon. First tube 12, and inner tube 26 may be of any selected length depending upon the application and use. For example, inner tube may be 3 feet long, 5 feet long, 8 feet long, or otherwise as desired. Collar housings 18 and 23, are preferably composed of a durable resilient material such as plastic, rubber, composite, metal, or the like. In the preferred embodiment of the invention, tapered pin 38, or ringed or notched pin 40, are composed of a durable resilient material such as plastic, metal, composite, or thermoplastic, for example. The detachable grooved grip 32, may be composed of plastic, rubber, neoprene, or other flexible, durable, material.

With reference now to FIG. 13 a bottom view of the locking assembly 20, which is similar to second locking assembly 21, is shown removed from the housing, according to one embodiment of the invention. Locking assembly 20, is configured with enlarged surface area 46, and angled actuator arm 42, is shown from a bottom view. Tapered pin 38, which may of course be replaced with a ringed or notched pin or button, is also shown.

FIG. 14 shows a pin attachment mechanism of the locking assembly 20 or 21, with pin 38, secured to mount 37, and to angled actuator arm 42, according to one embodiment of the invention. Tapered pin 38, may be replaced by ringed or notched pin 40, best seen in FIG. 15.

Figure 16:
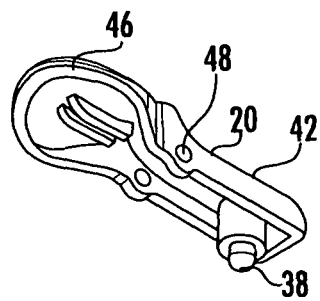
FIG. 16 shows a bottom view of a locking assembly removed from the housing, according to one embodiment of the invention.

FIG. 16 shows a bottom view of the locking assembly 20, with pin 38, removed from the housing, enlarged surface area 46, for facilitating pressing and snapping pin 38, in place in aperture 34 of inner decagon shaped tube 26, according to a preferred embodiment of the invention embodiment of the invention.

Figure 17:
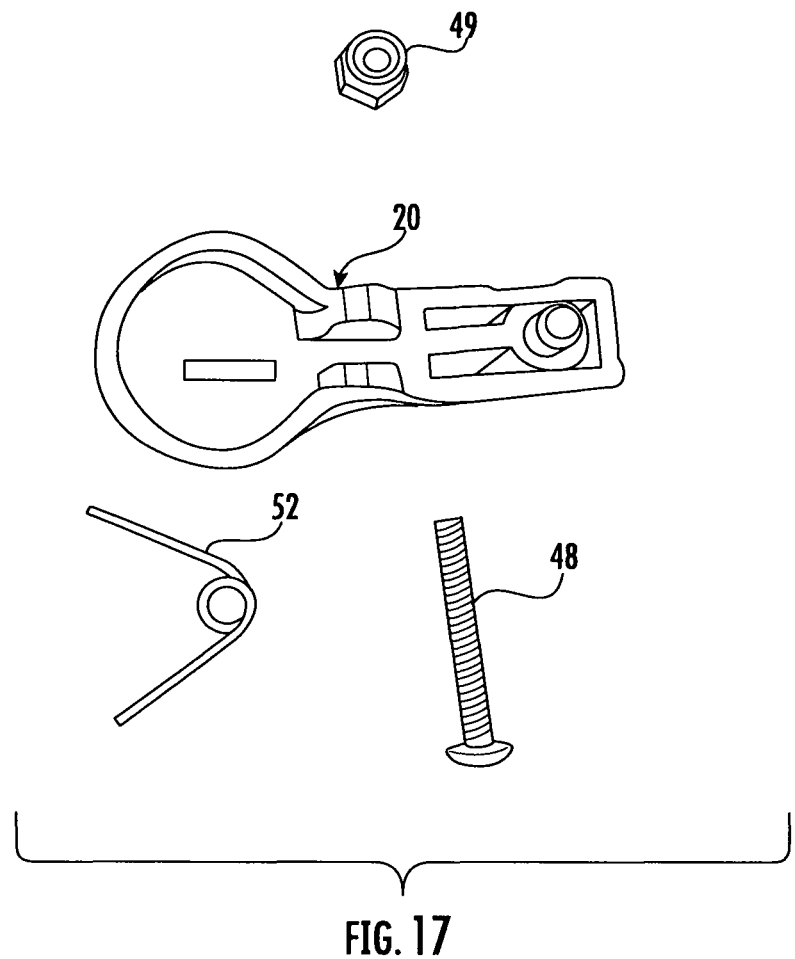
FIG. 17 shows a disassembled spring pressure mechanism of a locking assembly, according to one embodiment of the invention.

A disassembled spring pressure mechanism is shown FIG. 17, with spring 52, screw 48, bolt 49 to secure screw 48, and locking assembly 20 or 21, according to one embodiment of the invention.

Referring now to FIG. 18 the assembled spring pressure mechanism of the angled detent, is shown assembled by detached from housing collar 18, according to a preferred embodiment of the invention. Preferably spring 52, is operably engaged to screw 48, as shown, providing a spring pressure mechanism to force tapered pin 38, or notched or ringed pin 40, into an aperture 34, of inner dodecagon shaped tube 26.

In FIG. 19, inner tube 26, is shown with a plurality of stops 70, preferably positioned on the flat portions of the decagon shaped tube. Similar stops are preferably used on end tube 12. Stops 70, prevent the finished tool or apparatus for coming apart while in use, so preferably stops are used in each section of the tubes as need. In the preferred embodiment of the invention, stops are used forming flats or protrusions on each flat section of the decagon shaped tubes 12 and 26. Preferably, these flats are taller in size or larger in size on the outside diameter of the tube than the stops on in the inside diameter of the guide fittings.

Figure 20:
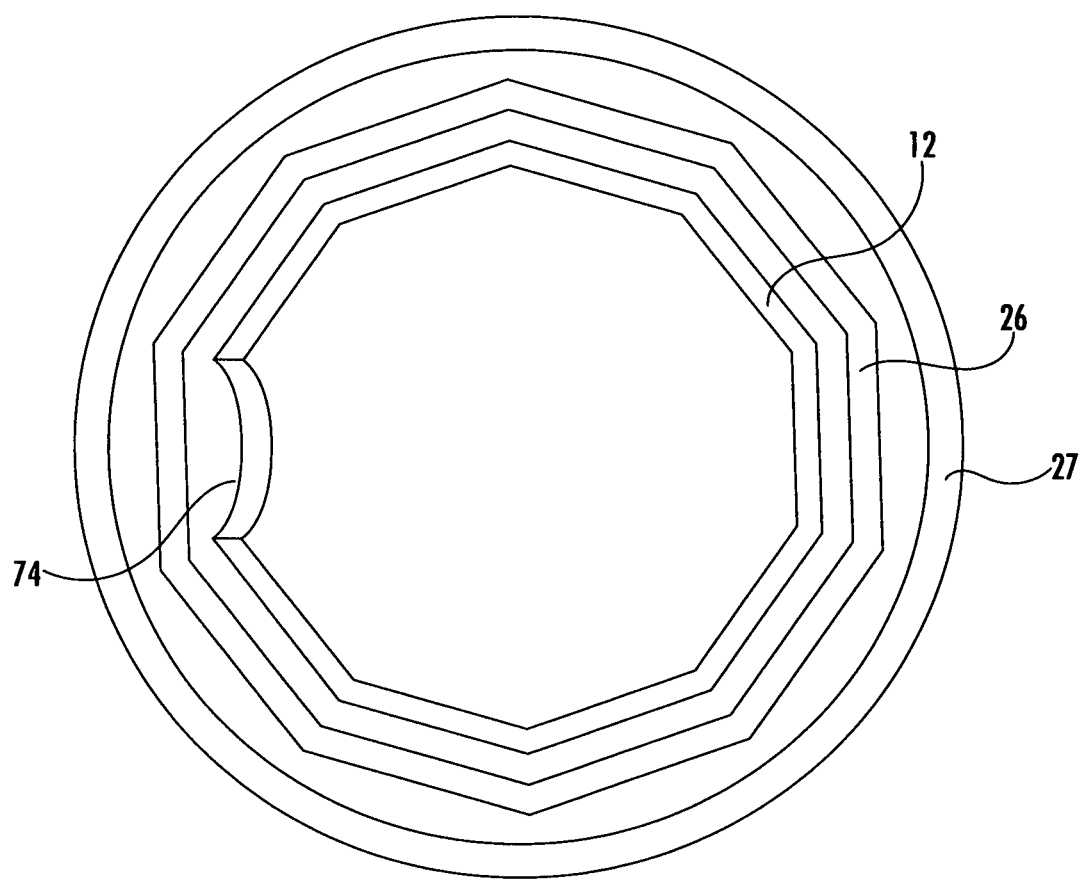
FIG. 20 shows an example of a concave sections or depressions on the first or inner tube, according to the invention.

With reference now to FIG. 20, a cutaway view of the three tubes is shown with inner tube 12, having a concave portion 74, positioned on one of the flats of tube 12. Preferably, the distance of the concave or depression needs to exceed the additional length of the pin or button after it comes through tube 26.

Figure 21:
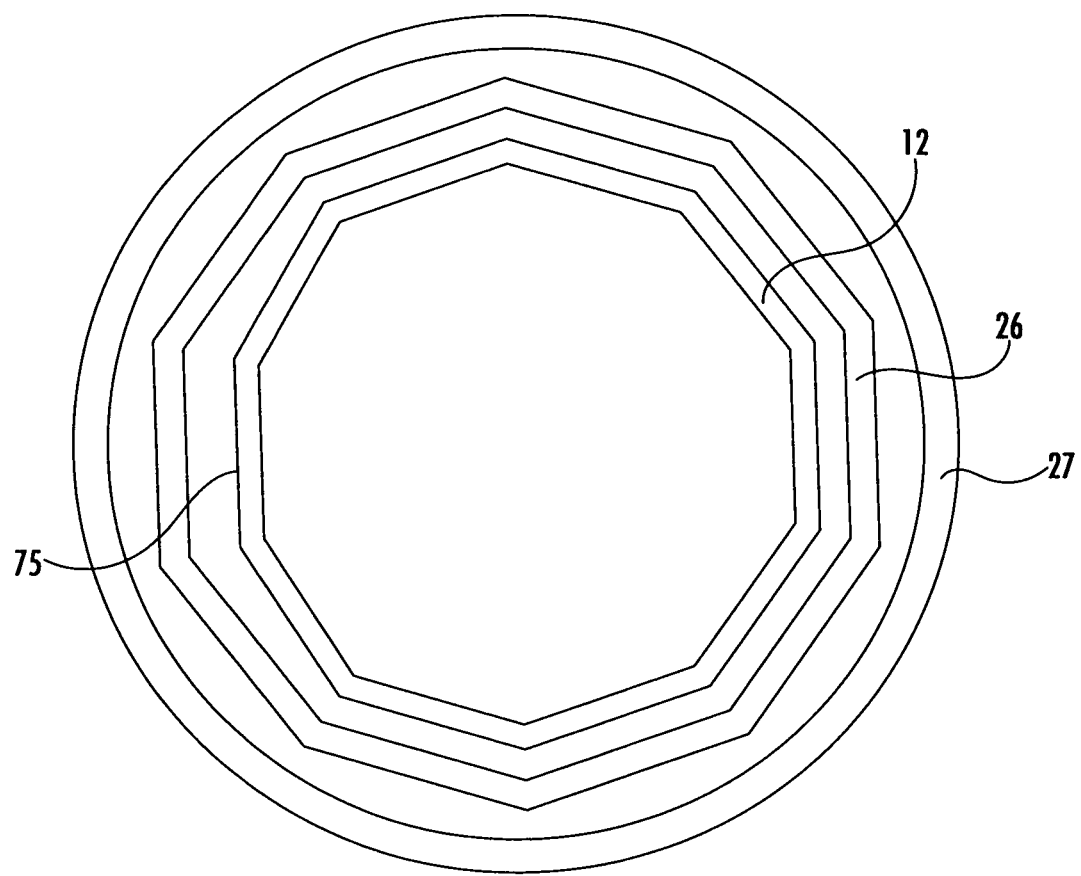
FIG. 21 shows a flattened section in the inner tube to create a clearance, according to the invention.

In FIG. 21, shows a flattened section 75, in the inner tube to create a clearance to eliminate tube 26, going through end tube 27. Preferably, the clearance is greater than the length of pin or button 38, so that pin can come through tube 26, but not tube 27. These depressions can be either concave or flat and can be used on round tubes as well as decagon shaped tubes.

Referring now to FIG. 22, shows a plurality of stops 70, are used preferably on the first tube 12 and inner tube 26, to prevent the finished pole or apparatus from coming apart while in use. Stops 76, may be flat or protrusions on each flat section of decagon shaped tubes 12 and 26. Preferably, stops 76, are taller in size or larger in size on the outside diameter of the tube than the flats on the inside diameter of the guide fitting. This creates a stop of the assembled pole or apparatus 10. according to the invention.

In operation and use, the telescoping pole 10, of the present invention provides an apparatus that may be used for cleaning swimming pools, cement finishing tools, ceiling wire tools and the like. In particular, the telescoping pole 10, provides an apparatus for attachment to tools for cleaning swimming pools, cement finishing tools, ceiling wire tools, or the like. Telescoping pole or apparatus 10, may be easy, safely, and efficiently used to extend the reach of the user while using the tool. Telescoping pole 10, easily and quickly snaps or locks into place by using a series of apertures in an inner decagon shaped pole. A pin that is tapered, notched or ringed and is used and controlled by spring pressure that forces the pin into an aperture and stays in place while forward and backward movement is applied. By providing a tapered or ringed pin, this eliminates the pin pulling up and out of the aperture when pressure and force is applied. Pole or tool 10, provides a pole which can be made of significant length while collapsing to the lease possible length. This requires that the tube slide into each other requiring enough clearance between the tubes. In addition, there needs to be enough clearance between pin 38, of locking assembly 20 and 21. Accordingly, there needs to be enough length on pin 38, so as not to wear to quickly. Being longer means that the pin will protrude through inner tube 26, and into the the apertures of tube 27 which is not desirable. To correct for this, pole or apparatus 10, preferably uses decagon shaped first and inner tubes. To achieve a proper clearance factor, concave or flat portions are used as described. As all poles are not consistently straight, such clearances are critical and require utilizing longer length pins, which not protruding the outer end tube. This also creates a stopping effect on the pulling up of the pin from the aperture, resulting in a stable and reliable lock position. Telescoping pole or apparatus 10, may be used for pool cleaning, cement finishing, ceiling wire applications and any application that requires different lengths of pole or tubing at different times of application. Telescoping pole 10, may be provided in a wide variety of different sizes and configurations.

Additional advantages and modification will readily occur to those skilled in the art. The invention in its broader aspects is, therefore, not limited to the specific details, representative apparatus and illustrative examples shown and described. Accordingly, departures from such details may be made without departing from the spirit or scope of the applicant's general inventive concept.

What is claimed is:

1. An apparatus for cleaning swimming pools, cement finishing tools, ceiling wire applications, comprising:
    a first decagon shaped tube having a first end with having a first collar housing and first locking assembly, said second end of said first tube being configured for attaching a tool thereto, said first locking assembly includes a ring shaped mechanism for securing a pin, and the first tube includes a longitudinal groove on a side thereof;
    an end tube having a first end having a second locking assembly,
    a decagon shaped inner tube having a first end and a second end, said first end being secured to said first tube by said first locking assembly, and said second end being secured to said end tube by said second locking assembly; said decagon shaped inner tube is adapted and configured to be received within said end tube within an aperture in second collar housing; the decagon shaped inner tube is shaped to slide within the end tube to a selected position in relation to the end tube, allowing for said second locking assembly to position and secure the decagon shaped inner tube within the end tube; and a plurality of apertures aligned on the decagon shaped inner tube, so that the second locking assembly, which includes an tapered pin, may be operably engaged with one of said apertures, to secure and position the decagon shaped inner tube at a selected position within said end tube.

2. The apparatus of claim 1, wherein said first locking assembly includes a ringed pin.

3. The apparatus of claim 1, wherein said second locking assembly includes tapered pin.

4. The apparatus of claim 1, wherein said second locking assembly includes a ringed pin.

5. The apparatus of claim 1, wherein said decagon shaped inner tube includes inner stops.

6. The apparatus of claim 1, wherein said first locking assembly includes a first angled actuator arm.

7. The apparatus of claim 1, wherein said second locking assembly includes a second angled actuator arm, and an actuator, comprising an enlarged surface area to facilitate activating said second angled actuator arm.

8. The apparatus of claim 1, wherein said first tube includes inner stops comprising raised knobs.

9. The apparatus of claim 1, wherein said first collar housing includes a fastening mechanism for securing said locking mechanism thereto.

10. The apparatus of claim 1, wherein said first locking assembly includes a ring-shaped mechanism for securing said tapered pin within one of a plurality of apertures in the first tube.

11. The apparatus of claim 1, wherein said groove in said first tube is positioned on a side thereof and has a flat portion, providing additional clearance for a pin positioned within said first tube, said decagon shaped inner tube, and said end tube.

12. A telescoping pole for swimming pool cleaning tools, comprising:
    a first tube having a first end having first locking assembly with a first collar housing, said second end of said first tube being configured for attaching a tool thereto, said first locking assembly includes a tapered pin and a first angled actuator arm, and the first tube includes a longitudinal groove on a side thereof;
    an end tube having a first end with a second locking assembly and a second collar housing; and
    a decagon shaped inner tube having a first end and a second end, said first end being secured to said first tube by said first locking assembly, and said second end being secured to said end tube by said second locking assembly.

13. The telescoping pole for swimming pool cleaning tools of claim 12, wherein said first locking assembly includes a tapered and ringed pin.

14. The telescoping pole for swimming pool cleaning tools of claim 12, wherein said second locking assembly includes a tapered pin.

15. The telescoping pole for swimming pool cleaning tools of claim 12, wherein said second locking assembly includes a first angled actuator arm and an actuator having an enlarged surface area to facilitate activating said angled actuator arm.

16. The telescoping tool for swimming pool cleaning tools of claim 12, wherein said first locking assembly includes said first angled actuator arm, and wherein said groove in said first tube is positioned on a side thereof and has a flat portion, providing additional clearance for said pin within said first tube, said decagon shaped inner tube, and said end tube.

* * * * *